UNITED STATES PATENT OFFICE.

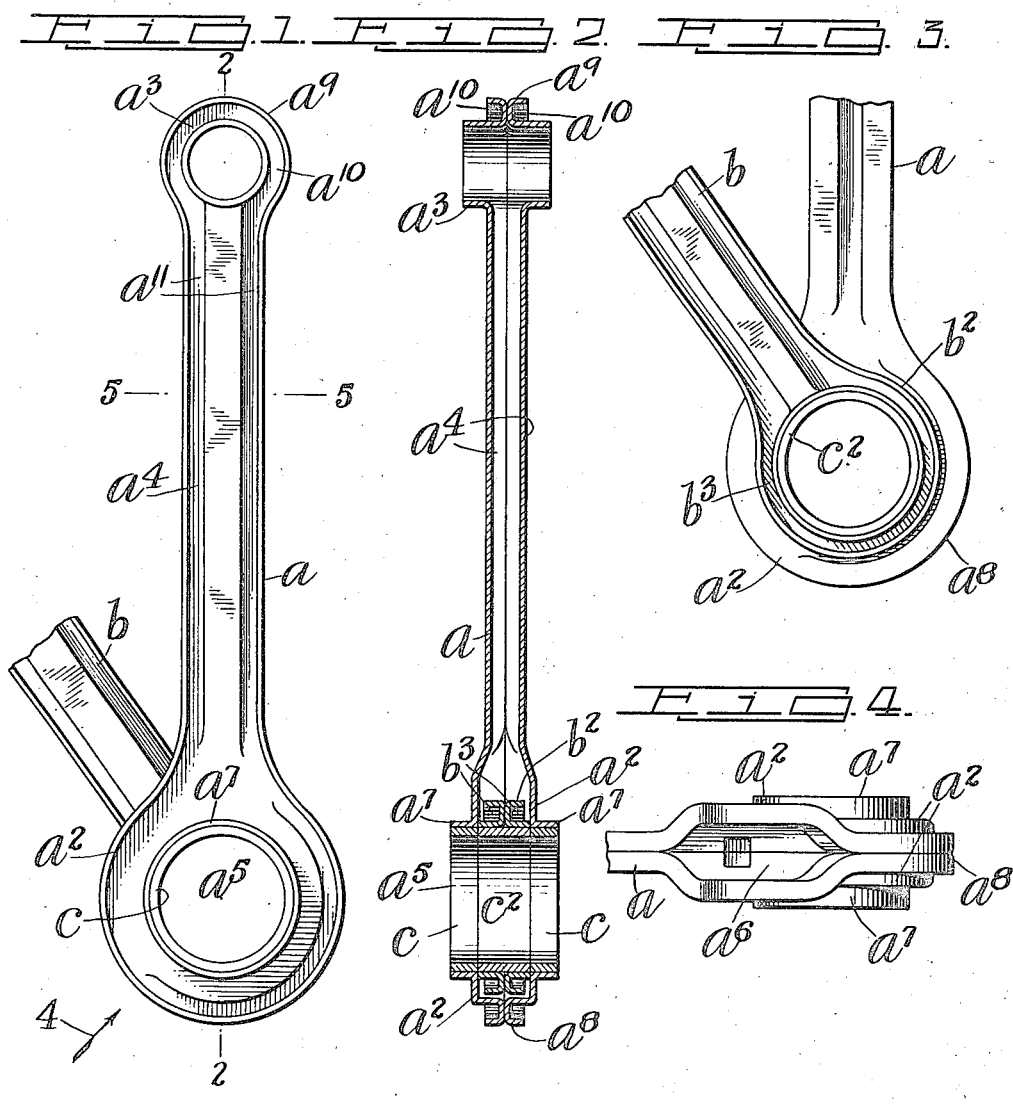
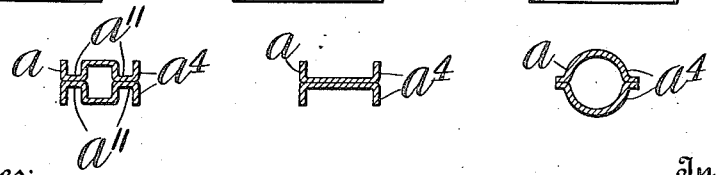

HEBRON B. LAYMAN, OF NEW YORK, N. Y., ASSIGNOR TO THE LAYMAN PRESSED ROD CO., INC., OF NEW YORK, N. Y., A CORPORATION OF NEW YORK.

FORKED CONNECTING-ROD.

1,176,300.  Specification of Letters Patent.  Patented Mar. 21, 1916.

Application filed April 24, 1915. Serial No. 23,728.

*To all whom it may concern:*

Be it known that I, HEBRON B. LAYMAN, a citizen of the United States, and residing at New York, in the county of New York and State of New York, have invented certain new and useful Improvements in Forked Connecting-Rods, of which the following is a specification, such as will enable those skilled in the art to which it appertains to make and use the same.

This invention relates to connecting rods and particularly to devices of this class used in connection with what are known as motor cycle vehicles in which two cylinders are employed and two connecting rods the larger ends or heads of which are also connected, one working within the other; and the object of the invention is to facilitate, simplify and cheapen the manufacture of devices of this class while at the same time rendering the same more light and durable than as usually constructed; and with this and other objects in view the invention consists in connecting rods of the class specified, constructed and operating as hereinafter described and claimed.

The invention is fully disclosed in the following specification, of which the accompanying drawing forms a part, in which the separate parts of my improvement are designated by suitable reference characters in each of the views, and in which:—

Figure 1 is a side view showing a pair of connecting rods made according to my invention, the smaller end of one of said rods being broken away; Fig. 2 a section on the line 2—2 of Fig. 1; Fig. 3 a view similar to Fig. 1 but showing one side portion of one of the rods removed; Fig. 4 a view looking in the direction of the arrow 4 in Fig. 1; Fig. 5 a transverse section of one of the rods on the line 5—5 of Fig. 1; and, Figs. 6 and 7 views similar to Fig. 5 but showing modified forms.

In carrying my invention into effect I provide two connecting rods $a$ and $b$ provided respectively with larger ends or head portions $a^2$ and $b^2$, and the rod $a$ is also provided with a smaller end or head portion $a^3$, as is also the rod $b$, but the smaller end or head portion of the rod $b$ is not shown, and for the purpose of this specification the rods $a$ and $b$ may be called main and supplemental rods respectively.

It will be understood, of course, that the larger ends or head portions of the rods $a$ and $b$ connect, in practice, with the crank shaft of the motor while the smaller ends or head portions connect with the pistons in the separate cylinders.

The road $a$ or the shank thereof is composed of two similar longitudinal members $a^4$ stamped from sheet metal, and each of which is provided with a half of the larger end or head portion $a^2$, and a half of the smaller end or head portion $a^3$, and the shank portion of said rod is preferably of the form shown in cross section in Fig. 5, but may be of the form shown in Figs. 6 and 7, or of any preferred transverse sectional shape, and the separate parts of the shank portion and of the smaller end or head portion are welded together and finished so that the said shank portion and smaller end or head portion will show no seam or seams.

The larger end or head portion $a^2$ of the rod $a$ is circular in form viewed as in Fig. 1, but is divided into two similar parts when viewed in section at right angles to the central aperture $a^5$ thereof, and the head $b^2$ of the rod $b$ fits between the separate parts of the head $a^2$ of the rod $a$, and said head $a^2$ is provided in one top side portion thereof with an aperture $a^6$ through which the head $b^2$ is passed into the head $a^2$, and the aperture $a^6$ is formed by expanding the side portions of the head $a^2$.

The separate side portions of the head $a^2$ are also provided around the central aperture $a^5$ with projecting flanges or rims $a^7$ within which are preferably placed and secured by welding or other means supplemental sleeve bearings $c$ and the side and bottom portions of the head $a^2$ opposite the aperture $a^6$ are provided with a central circumferential T-shaped flange $a^8$ formed partly in connection with one side portion of said head and partly in connection with the other side portion and which reinforces and strengthens said head.

The smaller end or head portion $a^3$ of the rod $a$ is provided with a circumferential flange or rim $a^9$ which is T-shaped in cross section and formed partly in connection with one side portion of said head and partly in connection with the other side portion of said head, and the flange or rim $a^9$ forms annular grooves $a^{10}$ around the outer side portions of said head and which communicate with and are continuous with longitudinal grooves $a^{11}$ in the opposite sides of the shank $a^4$ of said rod.

In the construction shown the rod $b$ is made in the same manner as the rod $a$ in all respects, except as to the larger end or head portion $b^2$, said head portion $b^2$ consisting of two similar side portions having deep annular grooves $b^3$ and the central aperture therein being provided with a supplemental sleeve bearing $c^2$ similar to and registering with the sleeve bearings $c$ in the separate side portions of the head $a^2$ of the rod $a$.

From the foregoing description it will be seen that the head $a^2$ of the rod $a$ consists of a circular annular and inclosed box into which the head $b^2$ of the rod $b$ is inserted through the aperture $a^6$ in one top side portion of the head $a^2$, and each of the rods $a$ and $b$ is free to rotate on the crank shaft in the usual manner, the aperture $a^6$ being sufficiently large to permit of the necessary movement of the head $b^2$ of the rod $b$, and while I have described the separate parts of the rod $a$ as stamped from sheet metal, my invention is not limited to this method of making said parts and the same may be cast, if desired, but the process of stamping out said parts from sheet metal is preferred by reason of the fact that the machining, grinding, or other finishing of the inner sides or surfaces of the separate parts of the head $a^2$ in order to avoid friction, and which is necessary when said parts are cast, is unnecessary when said parts are stamped from sheet metal, and this facilitates, simplifies and cheapens the manufacture of the rod or rods, to a large degree, and this also applies to the construction of the rod $b$ as well as to the rod $a$, and while I have shown and described the preferred manner of procedure in the manufacture of my improved connecting rod device or devices, my invention is not limited to the details herein shown and described, and changes therein and modifications thereof may be made, within the scope of the appended claims, without departing from the spirit of my invention or sacrificing its advantages.

Having fully described my invention, what I claim as new and desire to secure by Letters Patent, is:—

1. A connecting rod device consisting of two rods, the larger end portion of one rod, comprising an annular box member provided in one top side portion thereof with an aperture through which the larger end of the other rod is inserted.

2. A connecting rod device comprising main and supplemental rod members, the main rod member being provided with a box-shaped head which incloses the head of the supplemental rod member and is provided with a crank shaft aperture, the head of the main rod member being provided in one top side portion thereof with an aperture through which the head of the supplemental rod member is passed, and the sides of the head of the main rod member being provided with outwardly directed flanges around the central, crank-shaft, aperture therein.

3. A connecting rod device comprising main and supplemental rod members, the main rod member being provided with a box-shaped head which entirely incloses the head of the supplemental rod member, the head of the main rod member being provided in one top side portion thereof with an aperture through which the head of the supplemental rod member is passed, and the sides of the head of the main rod member being provided with outwardly directed flanges around the central, crank-shaft, aperture therein, and said flanges and the head of the supplemental rod member being provided with supplemental sleeve bearings around said aperture.

4. A crank rod device, comprising main and supplemental rods, the main rod consisting of two similar sheet metal side members and the larger end thereof being of circular and box-shaped form and being provided in one top side portion thereof with an aperture through which the larger end of the supplemental rod is inserted, said larger end of the supplemental rod being inclosed in the larger end of the main rod.

5. A crank rod device, comprising main and supplemental rods, the main rod consisting of two similar side sheet metal parts and the larger end thereof being of circular and box-shaped form and being provided in one top side portion thereof with an aperture through which the larger end of the supplemental rod is inserted, said larger end of the supplemental rod being inclosed in the larger end of the main rod, and the side portions of the larger end of the main rod being provided with outwardly directed flanges around the crank-shaft aperture therein.

6. A crank rod device, comprising main and supplemental rods, the main rod consisting of two similar side sheet metal parts and the larger end thereof being of circular and box-shaped form and being provided in one top side portion thereof with an aperture through which the larger end of the supplemental rod is inserted, said larger end of the supplemental rod being entirely inclosed in the larger end of the main rod, and the side portions of the larger end of the main rod being provided with outwardly directed flanges around the crank-shaft aperture therein, and one side and the bottom part of said larger end of the main rod being also provided with a central circumferential T-shaped rim member.

7. A connecting rod device, comprising main and supplemental rod members, the main rod member being provided with an annular box-shaped head which incloses the head of the supplemental rod member, the head of the main rod member being also provided in one top side portion thereof with an aperture through which the head of the supplemental rod member is passed and in which the shank of the supplemental rod member operates.

8. A connecting rod device, comprising main and supplemental rod members, the main rod member consisting of parts permanently secured together and splayed at the larger end to receive the larger end of the supplemental rod member.

9. A connecting rod device, comprising main and supplemental rod members, the main rod member being composed of a plurality of parts permanently secured together and spread at the crank end to form a fork between the tines of which the supplemental rod member is inserted.

10. A connecting rod device comprising main and supplemental rod members composed of a plurality of parts of sheet metal, each of said parts being provided with a crank end head which is annular in form and the parts of the crank end head of the main rod member being spread at one side to permit the insertion of the crank end head of the supplemental rod member and the separate parts of said rod members being permanently secured together throughout the length of the rod.

In testimony that I claim the foregoing as my invention I have signed my name in presence of the subscribing witnesses this 23rd day of April, 1915.

HEBRON B. LAYMAN.

Witnesses:
C. MULREANY,
H. E. THOMPSON.